(12) United States Patent
Chen (10) Patent No.: US 12,237,699 B2
(45) Date of Patent: Feb. 25, 2025

(54) MOBILE PHONE CHARGER WITH SMART NIGHT LAMP

(71) Applicant: Shenzhen Hualiwei Technology Co., Ltd, Shenzhen (CN)

(72) Inventor: Xizhi Chen, Shenzhen (CN)

(73) Assignee: Shenzhen Hualiwei Technology Co., Ltd., Shenzhen (CN)

( * ) Notice: Subject to any disclaimer, the term of this patent is extended or adjusted under 35 U.S.C. 154(b) by 201 days.

(21) Appl. No.: 18/169,335

(22) Filed: Feb. 14, 2023

(65) Prior Publication Data

US 2023/0361584 A1 Nov. 9, 2023

(30) Foreign Application Priority Data

May 5, 2022 (CN) .......................... 202210481397.5

(51) Int. Cl.
| | |
|---|---|
| *H02J 7/00* | (2006.01) |
| *F21V 33/00* | (2006.01) |
| *G01J 5/00* | (2022.01) |
| *G06F 3/16* | (2006.01) |
| *H02J 7/02* | (2016.01) |
| *F21Y 115/10* | (2016.01) |

(52) U.S. Cl.
CPC ........ *H02J 7/0042* (2013.01); *F21V 33/0004* (2013.01); *G01J 5/0025* (2013.01); *G06F 3/167* (2013.01); *H02J 7/007182* (2020.01); *H02J 7/02* (2013.01); *F21Y 2115/10* (2016.08)

(58) Field of Classification Search
CPC ...... H02J 7/0042; H02J 7/007182; H02J 7/02; H02J 7/00; H02J 7/00712; F21V 33/0004; F21V 23/00; F21V 23/04; F21V 23/0442; F21V 23/0471; G01J 5/0025; G06F 3/167; F21Y 2115/10; H05B 47/115; H05B 45/3725
See application file for complete search history.

(56) References Cited

U.S. PATENT DOCUMENTS

| | | | |
|---|---|---|---|
| 6,639,382 B1* | 10/2003 | Fan ........................ | H01M 6/505 320/114 |
| 8,378,631 B2* | 2/2013 | Ron ........................ | H05B 47/10 362/276 |
| 2004/0204177 A1* | 10/2004 | Pon ........................ | H02J 7/0045 455/90.3 |
| 2013/0285622 A1* | 10/2013 | Schwartz .................. | H02J 7/00 320/162 |

* cited by examiner

*Primary Examiner* — Bao Q Truong
(74) *Attorney, Agent, or Firm* — Westbridge IP LLC (57) ABSTRACT

Disclosed is a mobile phone charger with a smart night lamp including a housing, a plug, a port, a drive board, a sensing device, an illumination assembly, a circuit board and a power control circuit. The power control circuit includes a sensing module, a main control module, an illumination module and a power converting module. The sensing module is configured to collect a human computer interaction (HCI) signal through the sensing device. The main control module is connected to the sensing module and configured to generate an illumination control signal according to the HCI signal. The illumination module is connected to the main control module and configured to perform illumination according to the illumination control signal.

10 Claims, 6 Drawing Sheets

MOBILE PHONE CHARGER WITH SMART NIGHT LAMP

CROSS-REFERENCE TO RELATED APPLICATIONS

This application claims priority to Chinese Patent Application No. 202210481397.5, filed on May 5, 2022, the entire contents of which are incorporated herein by reference.

TECHNICAL FIELD

The present disclosure relates to the technical field of mobile phone chargers, in particular to a mobile phone charger with a smart night lamp.

BACKGROUND

As a portable electronic device and a supply voltage conversion device for electronic appliances, the mobile phone charger is in a small size, and has a plug and play characteristic, which not only is convenient for our daily carrying and use, but also brings great convenience to our life.

However, the existing mobile phone charger only has a single voltage conversion function. When the mobile phone charger is used in the dark ambient, the user needs light to find the mobile phone charger. In some cases, it is inconvenient for the user to turn on the light or obtain the light source, which causes a lot of inconvenience to the user.

SUMMARY

The main objective of the present disclosure is to provide a mobile phone charger with a smart night lamp, aiming to solve the problem that the existing mobile phone charger only has a single function, and causes a lot of inconvenience to the user.

In order to achieve the above objective, the present disclosure provides a mobile phone charger with a smart night lamp. The mobile phone charger includes a housing, a circuit board and a drive board. A side wall of the housing is provided with a plug. The circuit board is provided in the housing, and the circuit board is provided with a port. The drive board is provided in the housing and connected to the circuit board. A side of the drive board away from the circuit board is provided with a sensing device and an illumination assembly. The port extends through the drive board to the housing, and the circuit board is further provided with a power control circuit. The power control circuit includes a sensing module, a main control module, an illumination module and a power converting module. The sensing module is configured to collect a human computer interaction (HCI) signal through the sensing device. The main control module is connected to the sensing module and configured to generate an illumination control signal according to the HCI signal. The illumination module is connected to the main control module and configured to make the illumination assembly perform illumination according to the illumination control signal. The power converting module is connected to each of the sensing module, the main control module and the illumination module. The power converting module is configured to convert an alternating current received through the plug to a direct current, output a supply voltage to the port, and supply power to the sensing module, the main control module and the illumination module according to the supply voltage.

In an embodiment, the mobile phone charger further includes a horn provided in the housing. Another side wall of the housing is provided with a sound outlet corresponding to the horn. The power control circuit further includes a voice module connected to the main control module and the power converting module respectively. The main control module is further configured to generate a voice control signal according to the HCI signal. The voice module is configured to make the horn perform voice prompts according to the voice control signal. The power converting module is further configured to supply power to the voice module according to the supply voltage.

In an embodiment, the mobile phone charger further includes a standby battery provided in the housing. The power control circuit further includes a power module connected to each of the power converting module, the sensing module, the main control module and the illumination module. The power module is configured to charge the standby battery according to the supply voltage, and supply power to the sensing module, the main control module and the illumination module through the standby battery.

In an embodiment, the power module includes a battery unit, a charging unit and a voltage detection unit. The battery unit is configured to store electrical energy through the standby battery. The charging unit is connected to the power converting module and the battery unit respectively, and configured to charge the standby battery according to the supply voltage. The voltage detection unit is connected to the battery unit and the main control module respectively, and configured to detect an electric quantity stored in the standby battery and output a detection signal to the main control module. The main control module is further configured to generate a charging control signal according to the detection signal. The charging unit is further connected to the main control module, and configured to charge or stop charging according to the charging control signal.

In an embodiment, the mobile phone charger further includes a cover board provided on a side of the housing away from the plug. The cover board is provided on the side of the drive board away from the circuit board and is parallel to the drive board, and the cover board is made of a transparent material. The illumination module includes a drive unit and an illumination unit. The drive unit is connected to the main control module, and is configured to generate a drive signal according to the illumination control signal. The illumination unit is connected to the drive unit, and is configured to make the illumination assembly perform illumination according to the drive signal, and transmit light through the cover board.

In an embodiment, the mobile phone charger further includes a protective cover passing through and provided on the cover board at a position corresponding to the sensing device, and the protective cover is configured to wrap the sensing device. The sensing device includes an infrared receiving sensor and a human body induction sensor. The sensing module includes an infrared receiving unit and a human body induction unit. The infrared receiving unit is configured to receive an infrared signal through the infrared receiving sensor. The human body induction unit is configured to detect whether there is a human body approaching the mobile phone charger through the human body induction sensor and output a human body induction signal. The HCI signal is the infrared signal or the human body induction signal.

In an embodiment, the housing further includes a touch key provided on a surface of the housing. The sensing module further includes a key unit configured to collect a key signal triggered by the touch key. The HCI signal is the key signal.

In an embodiment, the sensing device further includes a brightness acquisition sensor. The sensing module further includes a brightness acquisition unit, and the brightness acquisition unit is configured to collect ambient brightness through the brightness acquisition sensor, and output a brightness acquisition signal. The main control module is connected to the brightness acquisition unit, and is further configured to generate a brightness adjustment signal according to the brightness acquisition signal. The illumination module is further configured to adjust illumination brightness of the illumination assembly according to the brightness adjustment signal.

In an embodiment, the main control module includes a programmable controller connected to the sensing module, and the programmable controller is configured to generate an illumination control signal according to a preset program and the HCI signal. The power converting module includes a voltage receiving unit, a voltage converting unit, a power management unit and a port unit. The voltage receiving unit is configured to receive the alternating current through the plug. The voltage converting unit is connected to the voltage receiving unit, and configured to perform voltage conversion on the alternating current and output the direct current. The power management unit is connected to each of the voltage converting unit, the sensing module, the main control module and the illumination module. The power management unit is configured to output the supply voltage according to the direct current, and output the supply voltage to the sensing module, the main control module and the illumination module. The port unit is connected to the power management unit, and configured to output the supply voltage to a charging device through the port.

The present disclosure provides a mobile phone charger with a smart night lamp. The HCI signal is collected by the sensing module, and the main control module generates an illumination control signal according to the HCI signal. The illumination module performs illumination according to the illumination control signal. The power conversion module is configured to convert the received alternating current into the direct current, output the supply voltage to the port, and supply power to the sensing module, the main control module and the illumination module, thereby enabling the mobile phone charger to charge and perform illumination. In the present disclosure, functional modules such as a sensing module and an illumination module are provided in the conventional mobile phone charger to provide a convenient way to control illumination, which is convenient for users to use the mobile phone charger in a dark ambient, and solves the problem that the existing mobile phone charger only has a single function. In this way, the function diversity and the use convenience of the mobile phone charger can be improved, and the mobile phone charger can charge and perform illumination, thereby saving materials and increasing the use value of products.

BRIEF DESCRIPTION OF THE DRAWINGS

In order to more clearly illustrate embodiments of the present disclosure or technical solutions in the related art, drawings used in the embodiments or the related art will be briefly described below. Obviously, the drawings in the following description are only some embodiments of the present disclosure. It will be apparent to those skilled in the art that other figures can be obtained according to the drawings without creative work.

The realization of the objective, functional characteristics, and advantages of the present disclosure are further described with reference to the accompanying drawings.

DETAILED DESCRIPTION OF THE EMBODIMENTS

It should be understood that the specific embodiments described herein are only configured to explain the present disclosure, not to limit the present disclosure.

The existing mobile phone charger only has a single charging function. When the mobile phone charger is used in the dark ambient, the user needs light to find the mobile phone charger. In some cases, it is inconvenient for the user to turn on the light or obtain the light source.

The present disclosure provides a technical solution. The circuit board 110 provided in the housing 100 is configured to connect the plug 101 and the port 111, thereby realizing a charging function of the conventional mobile phone charger. A drive board 120 is provided in the housing 100 and connected to the circuit board 110. A sensing device 121 and an illumination assembly 122 are provided on the drive board 120, and a human computer interaction signal is collected by the sensing device 121. The illumination assembly 122 is controlled by the circuit board 110 for illumination, which enables the mobile phone charger to charge and perform illumination, and solves the problem that the existing mobile phone charger only has a single function, thereby improving the function diversity and the use convenience of the mobile phone charger. Embodiments of the present disclosure are described in the following, and the mobile phone charger with a smart night lamp applied in the technical solution of the present disclosure will be described with reference to the accompanying drawings.

Figure 1:
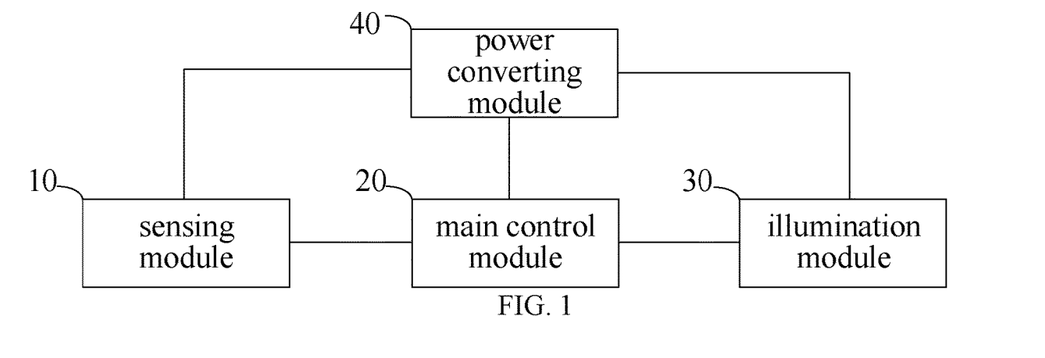
FIG. 1 is a schematic diagram of functional modules in a power control circuit of a mobile phone charger with a smart night lamp according to a first embodiment of the present disclosure.
Figure 2:
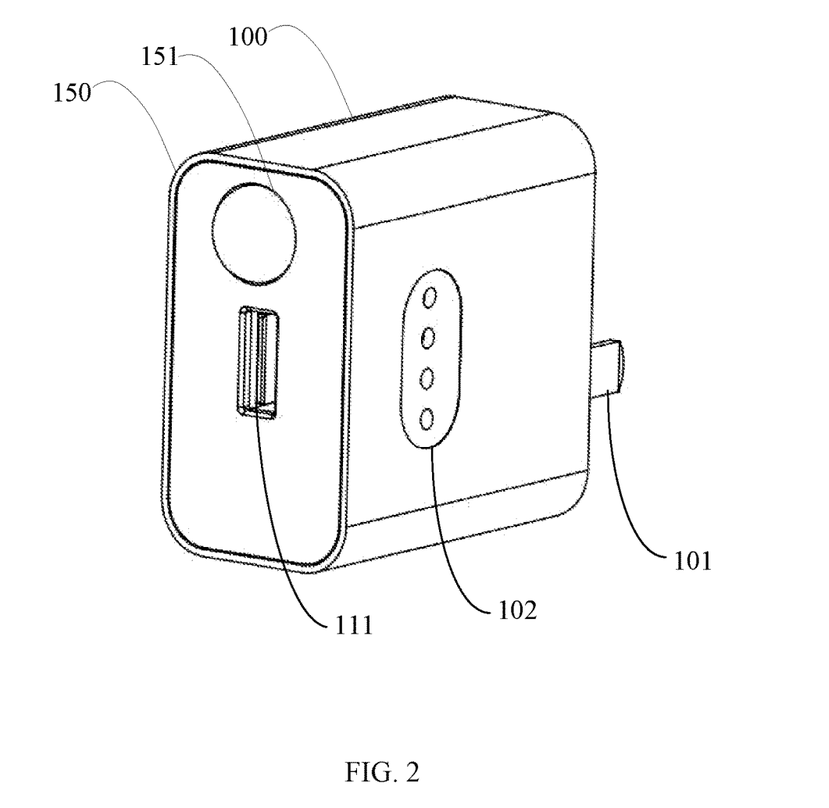
FIG. 2 is a schematic view of an external structure of the mobile phone charger with the smart night lamp according to the present disclosure.
Figure 3:
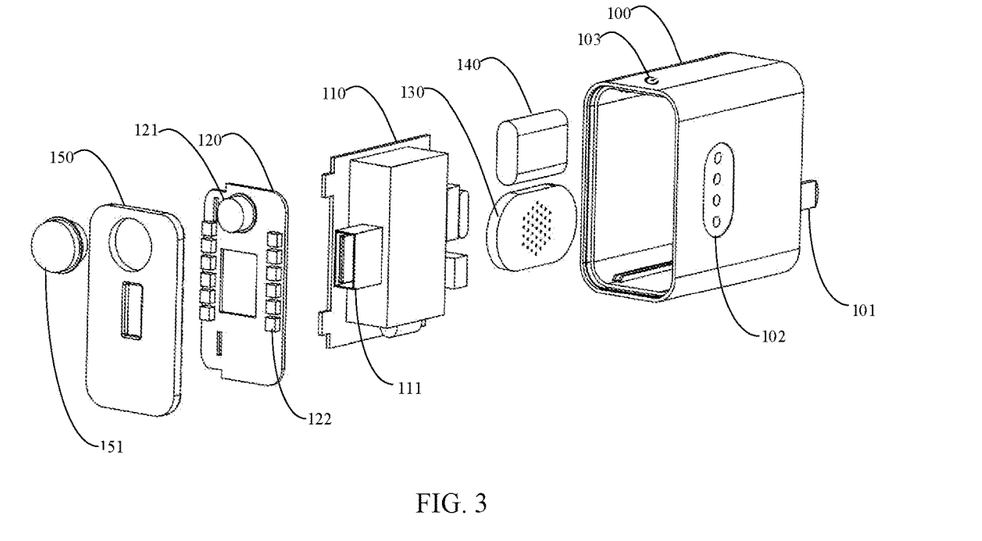
FIG. 3 is a structural schematic view of the mobile phone charger with the smart night lamp according to the present disclosure.

As shown in FIG. 1 to FIG. 3, a first embodiment of the mobile phone charger with the smart night lamp is provided in the present disclosure.

FIG. 2 is a schematic view of an external structure of the mobile phone charger, and FIG. 3 is a structural schematic view of the mobile phone charger. The mobile phone charger may include a housing 100, a circuit board 110 and a drive board 120.

A side wall of the housing 100 is provided with a plug 101. The circuit board 110 is provided in the housing 100, and the circuit board 110 is provided with a port 111. The drive board 120 is provided in the housing 100 and connected to the circuit board 110. Aside of the drive board 120 away from the circuit board 110 is provided with a sensing device 121 and an illumination assembly 122. The port 111 extends through the drive board 120 to the housing 100, and the circuit board 110 is further provided with a power control circuit.

As shown in FIG. 3, the housing 100 can be a hollow cylinder, a cube, and the like. The plug 101 can be provided on any side wall of the housing 100. As shown in FIG. 3, on a right side wall of the housing 100, the plug 101 is made of the conductive metal and is configured to plug into the mains port. The plug 101 can further be connected to the circuit board 110. Both the circuit board 110 and the drive board 120 are provided in the housing 100. As shown in FIG. 3, the circuit board 110 can be tightly attached to a rear side wall of the housing 100. The drive board 120 can be connected to the circuit board 110 at a certain angle, which will save the internal space of the housing 100. As shown in FIG. 3, the drive board 120 is vertically plugged with the circuit board 110. The drive board 120 is provided on a left side of the circuit board 110, and is parallel to a left side wall of the housing 100. It can be understood that the drive board 120 can be welded to the circuit board 110, or the drive board 120 can be spliced with the circuit board 110, or by other connection means. The port 111 is provided on one side surface of the circuit board 110. As shown in FIG. 2 and FIG. 3, the port 111 extends through the drive board 120 of the housing 100 to the housing 100, and the port 111 is configured to plug in the data line, to charge the mobile phone charger. Both the sensing device 121 and the illumination assembly 122 are provided on a same side of the drive board 120 away from the circuit board 110. The circuit board 110 is provided with a power control circuit to control the mobile phone charger.

FIG. 1 is a schematic diagram of functional modules in the power control circuit of the mobile phone charger. The power control circuit may include a sensing module 10, a main control module 20, an illumination module 30, and a power converting module 40.

The sensing module 10 is configured to collect a human computer interaction (HCI) signal through the sensing device 121.

The sensing module 10 can be an infrared sensor, an infrared remote control receiver, and the like, which can be set according to actual needs. The HCI signal can be an infrared signal, a key signal, and the like.

In an embodiment, the sensing module 10 is an infrared remote control receiver, and the HCI signal can be sent by a remote controller. The remote controller can be operated by the user to send an infrared signal requested by a remote controller. Then the infrared signal requested by the remote controller is correspondingly received by the infrared remote control receiver. In this case, the HCI signal is the infrared signal requested by the remote controller.

The main control module 20 is connected to the sensing module 10 and configured to generate an illumination control signal according to the HCI signal.

The main control module 20 may be a programmable controller 21, such as a single chip microcomputer U3 or a microprocessor.

In an embodiment, the received HCI signal is transmitted to the main control module 20 by the sensing module 10. An illumination control signal is generated by the main control module 20 according to the HCI signal, and then the main control module 20 is configured to transmit the illumination control signal to the illumination module 30.

The illumination module 30 is connected to the main control module 20 and configured to make the illumination assembly 122 perform illumination according to the illumination control signal.

In an embodiment, the illumination module 30 has a variety of illumination modes, such as the "sensing light" mode, the "ambient light" mode, and the like, which can be switched according to actual needs. The color and brightness of the light can further be adjusted according to actual needs. In the "sensing light" mode, the illumination module 30 will adaptively adjust the brightness of the light according to the ambient brightness.

The power converting module 40 is connected to each of the sensing module 10, the main control module 20 and the illumination module 30. The power converting module 40 is configured to convert an alternating current received through the plug 101 to a direct current, output a supply voltage to the port 111, and supply power to the sensing module 10, the main control module 20 and the illumination module 30 according to the supply voltage.

In an embodiment, when the plug 101 of the mobile phone charger is plugged into the mains port and the charging line of the mobile phone is plugged into the port 111, the alternating current of the mains port is received by the plug 101, then the alternating current is sent to the power converting module 40. The alternating current is converted to a direct current by the power converting module 40, to obtain a supply voltage. The supply voltage can be transmitted to the mobile phone through the port 111, and can further be transmitted to the sensing module 10, the main control module 20 and the illumination module 30 to provide a working voltage, so that the sensing module 10, the main control module 20 and the illumination module 30 can start to work. After the sensing module 10 collects the HCI signal through the sensing device 121, the HCI signal is sent to the main control module 20, and the main control module 20 is configured to generate an illumination control signal according to the HCI signal. Then the illumination control signal is transmitted to the illumination module 30 by the main control module 20. The illumination module 30 is configured to drive the illumination assembly 122 to perform illumination according to the illumination control signal, which may provide illumination for the user. In this way, the mobile phone charger can both charge and illuminate.

Compared with the conventional mobile phone charger that can only charge mobile phones, this embodiment provides a mobile phone charger with a smart night lamp. The sensing device 121 and the illumination assembly 122 are provided in the housing 100 of the mobile phone charger. In addition, functional modules, such as the sensing module 10 and the illumination module 30, are provided on the control circuit of the mobile phone charger. In this way, the mobile phone charger is combined with a small night lamp, which not only saves materials and is easy to carry, but also makes the mobile phone charger have more functions and the use of the mobile phone charger more convenient.

As shown in FIG. 2 to FIG. 6, based on the first embodiment, a second embodiment of the mobile phone charger with the smart night lamp is provided in the present disclosure.

Further, FIG. 2 is a schematic view of an external structure of the mobile phone charger, and FIG. 3 is a structural schematic view of the mobile phone charger. The mobile phone charger may further include a horn 130 provided in the housing 100, and another side wall of the housing 100 is provided with a sound outlet 102 corresponding to the horn 130.

As shown in FIG. 3, the horn 130 may be fixed in the housing 100 by pasting or other means, and may be connected to the circuit board 110. The sound outlet 102 can be a porous structure, and the porous structure may have various shapes. For example, the porous structure may be formed by a ring of small holes distributed in an annular shape. For another example, as shown in FIG. 3, the porous structure of the sound outlet 102 of the housing 100 may be formed by a row of small holes distributed vertically. It can be understood that the sound outlet 102 can be provided at a position relative to the horn 130 in the housing 100, so that the horn 130 has a better sound emitting effect.

The aforementioned "another side wall of the housing 100" is a side wall different from a certain side wall that the plug 101 is provided on the housing 100. As shown in FIG. 2, the plug 101 and the sound outlet 102 are provided on different side walls of the housing 100, which can prevent the sound emitting effect from being affected when the plug 101 is plugged in the mains port.

Figure 4:
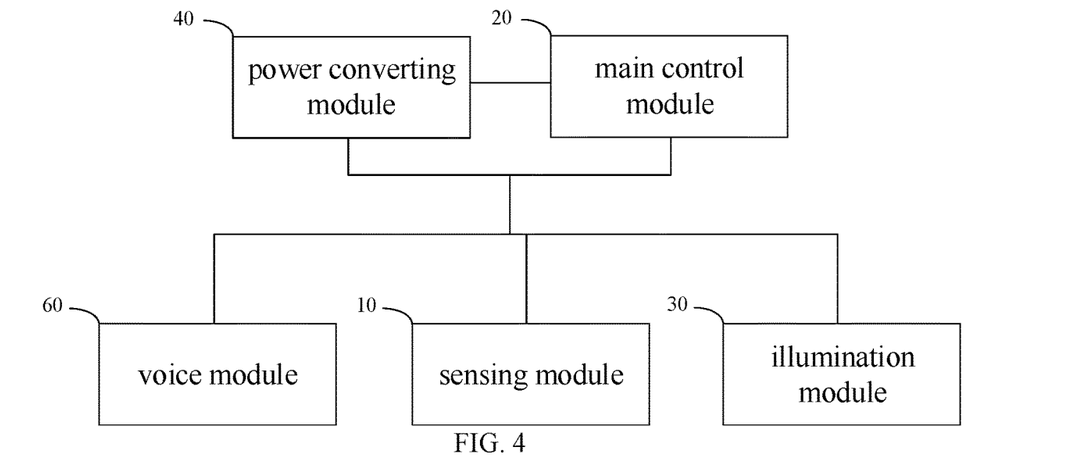
FIG. 4 is a schematic diagram of functional modules in the power control circuit of the mobile phone charger with the smart night lamp according to a second embodiment of the present disclosure.

FIG. 4 is a schematic diagram of functional modules in the power control circuit of the mobile phone charger. The power control circuit can further include a voice module 60 connected to the main control module 20 and the power converting module 40 respectively.

The main control module 20 is further configured to generate a voice control signal according to the HCI signal.

The voice module 60 is configured to make the horn 130 perform voice prompts according to the voice control signal.

The power converting module 40 is further configured to supply power to the voice module 60 according to the supply voltage.

In this embodiment, the mobile phone charger includes a sensing module 10, a main control module 20, an illumination module 30, a power converting module 40 and a voice module 60.

The sensing module 10 is respectively connected to the main control module 20 and the power converting module 40, and is configured to collect a HCI signal, such as a key signal, an infrared signal, an ambient brightness signal, and the like. The sensing module 10 is configured to output the collected signals to the main control module 20. According to the received signals, the main control module 20 is configured to generate illumination control signals, brightness adjustment signals, voice control signals, and the like. Further, the main control module 20 is configured to control the corresponding modules.

The illumination module 30 connected to the main control module 20 and the power converting module 40 respectively, is configured to perform illumination according to the illumination control signal, and is further configured to adjust brightness according to the brightness adjustment signal.

The power converting module 40 is connected to each of the sensing module 10, the main control module 20, the illumination module 30 and the voice module 60, and is configured to convert a received alternating current to a direct current. Further, the power converting module 40 is configured to output a supply voltage to the sensing module 10, the main control module 20, the illumination module 30 and the voice module 60, and supply power to the above modules. In addition, the power converting module 40 is further configured to output the supply voltage to the charging device connected to the mobile phone charger.

The voice module 60 is connected to the power converting module 40 and the main control module 20 respectively, and is configured to perform voice prompts according to the voice control signal.

In an embodiment, by controlling the remote control, the sensing response of the mobile phone charger can be set to the sensing illumination display or the sensing voice prompt. The sensing voice prompt is that: after the sensing module 10 of the mobile phone charger receives the infrared signal reflected by the user, the infrared signal is sent to the main control module 20, and the main control module 20 generates a voice control signal, then the voice control signal is sent to the voice module 60, thereby controlling the voice module 60 to emit the preset sound.

For example, the preset sound can be set as an alarm. When the distance between the user and the mobile phone charger is less than the preset distance, the voice module 60 of the mobile phone charger may promptly sound an alarm. After the user leaves the preset distance range, the alarm stops. Moreover, the remote controller may be used to directly control the alarm to stop. Or when the alarm sounds, the user can track the location of the mobile phone charger according to the alarm. After the mobile phone charger is found, the voice prompt can be manually turned off through the preset key, and the mobile phone charger automatically enters a low power mode after turning off the voice prompt for a preset time.

Figure 5:
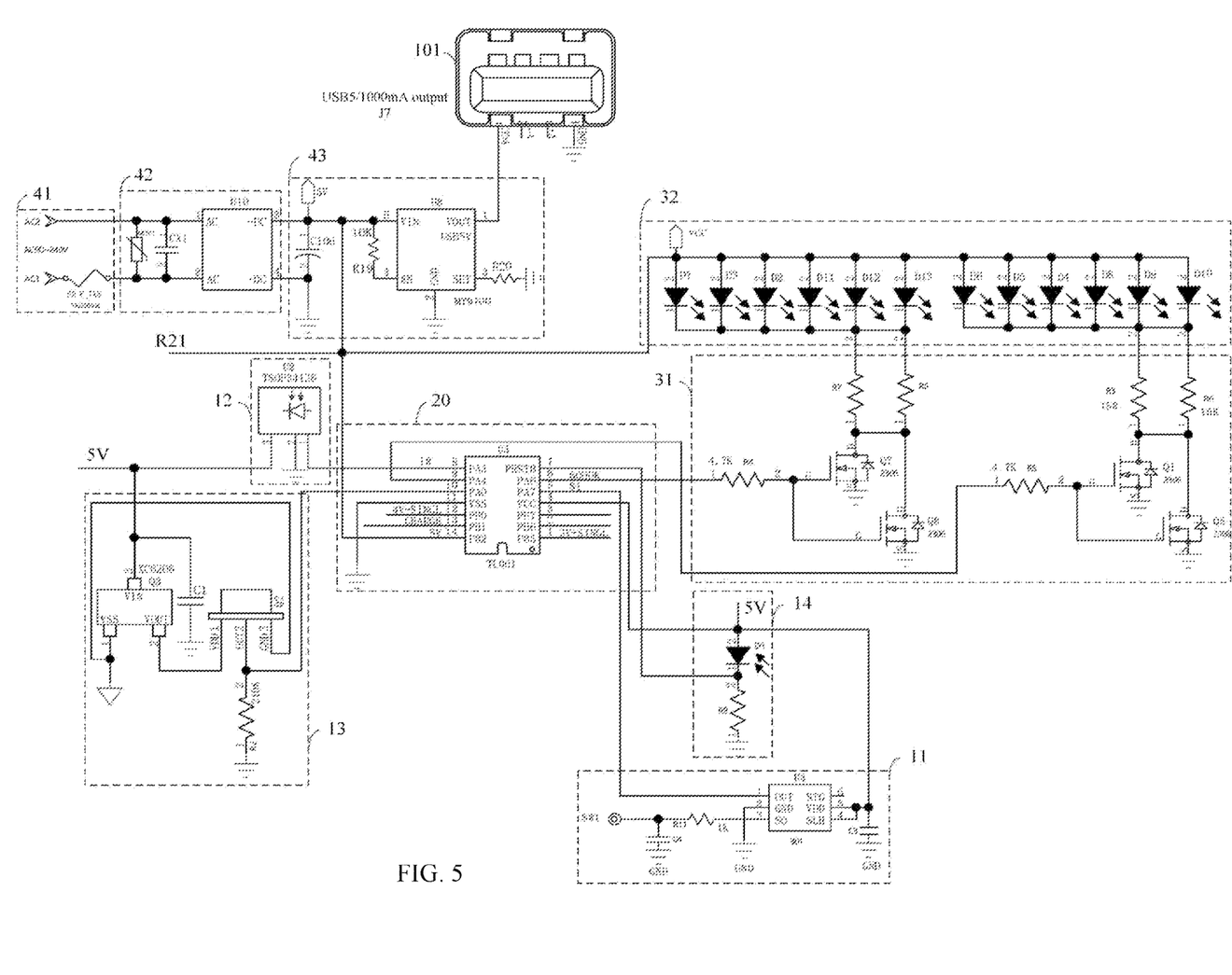
FIG. 5 is a schematic circuit diagram of a sensing module, a main control module, an illumination module and a power converting module in FIG. 4.
Figure 6:
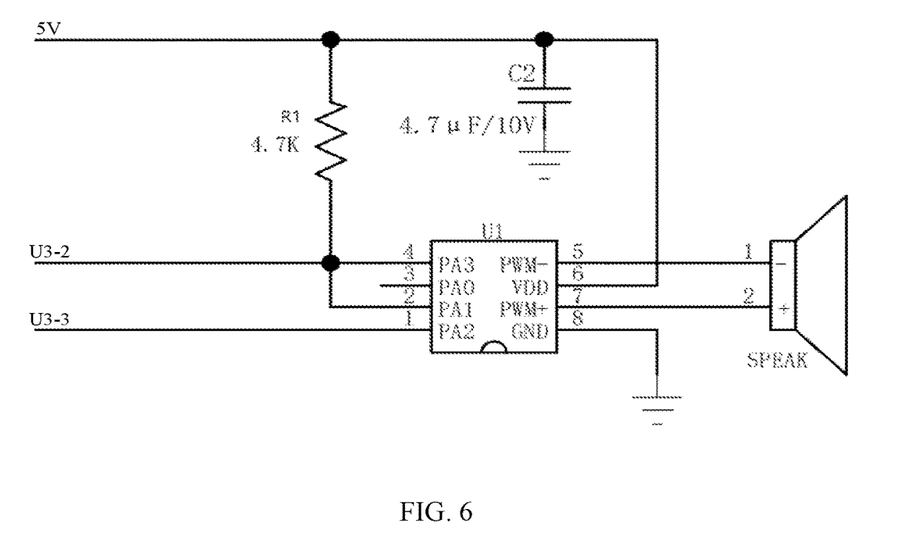
FIG. 6 is a schematic circuit diagram of a voice module in FIG. 4.

FIG. 5 is a schematic circuit diagram of a sensing module 10, a main control module 20, an illumination module 30 and a power converting module 40, and FIG. 6 is a schematic circuit diagram of a voice module 60. The voice module 60 includes a voice chip U1, and a horn 130 is represented as "SPEAK" in the circuit.

A first pin PA2 of the voice chip U1 is connected to the main control module 20, and is connected to a third pin PB7 of the single chip microcomputer U3 in FIG. 6. A second pin PA1 of the voice chip U1 is connected to a fourth pin PA3 of the voice chip U1, and the third pin PA0 is vacant. The fourth pin PA3 is further connected to the second pin PB6 of the single chip microcomputer U3, and the fourth pin PA3 of the voice chip U1 is further connected to the power converting module 40 through the resistor R1. The sixth pin VDD of the voice chip U1 is connected to the capacitor C2 and the power converting module 40 respectively. The fifth pin PWM− and the seventh pin PWM+ of the voice chip U1 are respectively connected to the horn 130 "SPEAK", and the eighth pin GND is grounded.

After receiving the supply voltage output by the power converting module 40, the voice chip U1 is powered on, and the voice control signal emitted from the single chip microcomputer U3 is received by the voice chip U1. Then the horn 130 "SPEAK" is controlled to make a sound, thereby realizing the voice prompt function of the mobile phone charger.

This embodiment provides a mobile phone charger with a smart night lamp. Not only the horn 130 is provided in the housing 100 of the mobile phone charger, but also a sound outlet 102 corresponding to the horn 130 is provided on the housing 100. In addition, a voice module 60 is provided on the control circuit of the mobile phone charger. In this way, the mobile phone charger further has a voice prompt function, and the user can switch to more functional modes according to actual needs.

As shown in FIG. 2, FIG. 3, FIG. 5, FIG. 7 and FIG. 8, based on the first embodiment or the second embodiment, the present disclosure provides a third embodiment of a mobile phone charger with a smart night lamp.

Further, FIG. 2 is a schematic view of an external structure of the mobile phone charger, and FIG. 3 is a structural schematic view of the mobile phone charger. The mobile phone charger may further include a standby battery 140 provided in the housing 100.

The standby battery 140 may be a battery that can be charged and discharged, such as a lithium battery, and the standby battery 140 is fixed in the housing 100 by pasting and other means.

Figure 7:
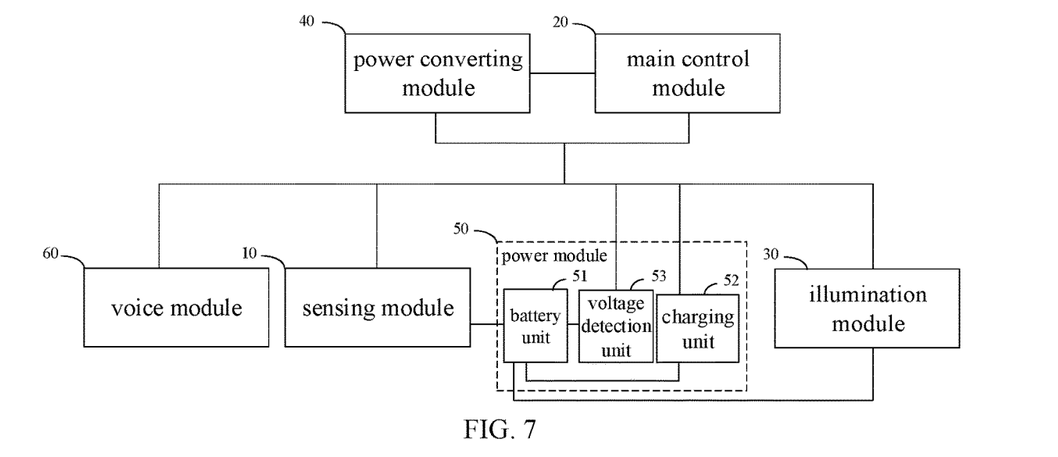
FIG. 7 is a schematic diagram of functional modules in the power control circuit of the mobile phone charger with the smart night lamp according to a third embodiment of the present disclosure.

FIG. 7 is a schematic diagram of functional modules in the power control circuit of the mobile phone charger. The power control circuit can further include a power module 50 connected to each of the power converting module 40, the sensing module 10, the main control module 20 and the illumination module 30. The power module 50 is configured to charge the standby battery 140 according to the supply voltage of the power converting module 40, and supply power to the sensing module 10, the main control module 20 and the illumination module 30 through the standby battery 140.

Further, the power module 50 may include a battery unit 51, a charging unit 52 and a voltage detection unit 53. The battery unit 51 is configured to store electrical energy through the standby battery 140.

The charging unit 52 is connected to the power converting module 40 and the battery unit 51 respectively, and is configured to charge the standby battery 140 according to the supply voltage. The charging unit 52 is further configured to work or stop working according to the detection signal.

The voltage detection unit 53 is connected to the battery unit 51 and the main control module 20 respectively, and is configured to detect an electric quantity stored in the battery unit 51 and output a detection signal to the main control module 20.

The main control module 20 is further configured to generate a charging control signal according to the detection signal.

The charging unit 52 is further connected to the main control module 20, and is configured to charge or stop charging according to the charging control signal.

In this embodiment, the mobile phone charger includes a sensing module 10, a main control module 20, an illumination module 30, a power converting module 40, a power module 50 and a voice module 60.

The power module 50 includes a battery unit 51, a charging unit 52 and a voltage detection unit 53.

The sensing module 10 is respectively connected to the main control module 20, the power converting module 40 and the battery unit 51 of the power module 50, and is configured to collect HCI signals.

The illumination module 30 is respectively connected to the main control module 20, the power converting module 40 and the battery unit 51 of the power module 50, and is configured to perform illumination according to the illumination control signal. The illumination module 30 is further configured to adjust brightness according to the brightness adjustment signal.

The power converting module 40 is connected to each of the sensing module 10, the main control module 20, the illumination module 30, the charging unit 52 of the power module 50, and the voice module 60. The power converting module 40 is configured to convert the received alternating current to the direct current, output the supply voltage, and supply power to the above modules according to the supply voltage. In addition, the power converting module 40 is configured to output the supply voltage to the charging device connected to the mobile phone charger.

The voice module 60 is connected to the power converting module 40 and the main control module 20, and is configured to perform voice prompts according to the voice control signal.

The charging unit 52 of the power module 50 is connected to the power converting module 40, and is configured to perform charging according to the supply voltage. The battery unit 51 of the power module 50 is respectively connected to the sensing module 10, the main control module 20 and the illumination module 30, and is configured to supply power to the sensing module 10, the main control module 20 and the illumination module 30.

The battery unit 51 is configured to store electrical energy. The charging unit 52 is respectively connected to the power converting module 40 and the battery unit 51, and is configured to charge the battery unit 51 according to the supply voltage. The charging unit 52 is further configured to receive the charging control signal sent by the main control module 20, to charge or stop charging according to the charging control signal. The voltage detection unit 53 is respectively connected to the battery unit 51 and the main control module 20, and is configured to detect the electric quantity stored in the battery unit 51 and output a detection signal to the main control module 20. In this way, the main control module 20 may generate a charging control signal according to the detection signal.

As a backup power of the mobile phone charger, the power module 50 can supply power to the sensing module 10, the main control module 20 and the illumination module 30 when the mobile phone charger is not connected to the alternating current. When the mobile phone charger is connected to the alternating current, the power module 50 is configured to receive the supply voltage of the power converting module 40 and automatically detect the charging. The voltage detection unit 53 is configured to detect the voltage of the battery unit 51, and send the detected voltage signal to the main control module 20, or output a low voltage/high voltage signal to the main control module 20. The main control module 20 is configured to control the charging unit 52 to work or stop working according to the detected voltage signal or the low voltage/high voltage signal. When the detected voltage is less than the preset voltage, that is, the electric quantity is lower than the preset electric quantity, the main control module 20 is configured to control the charging unit 52 to charge. When the detected voltage is greater than or equal to the preset voltage, that is, the electric quantity is fully charged or sufficient, the main control module 20 is configured to control the charging unit 52 to stop charging.

In an embodiment, when the mobile phone charger is used to charge the mobile phone, the mobile phone charger is connected to the alternating current. When the voltage detection unit 53 of the power module 50 detects that the voltage of the battery unit 51 is lower than the preset voltage, a low voltage signal is output to the main control module 20. The main control module 20 outputs a control signal to control the charging unit 52 to charge the battery unit 51.

When the electric quantity is charged to a preset electric quantity, for example, the electric quantity value is 100, the voltage detection unit 53 outputs a high voltage signal to the main control module 20. Then the main control module 20 controls the charging unit 52 to stop charging. When the mobile phone charger is not connected to the alternating current, since the battery unit 51 of the power module 50 stores the electric energy, the battery unit 51 can still supply power to the sensing module 10, the main control module 20 and the illumination module 30. In this way, the mobile phone charger still has the illumination function although not connected to the mains power.

Figure 8:
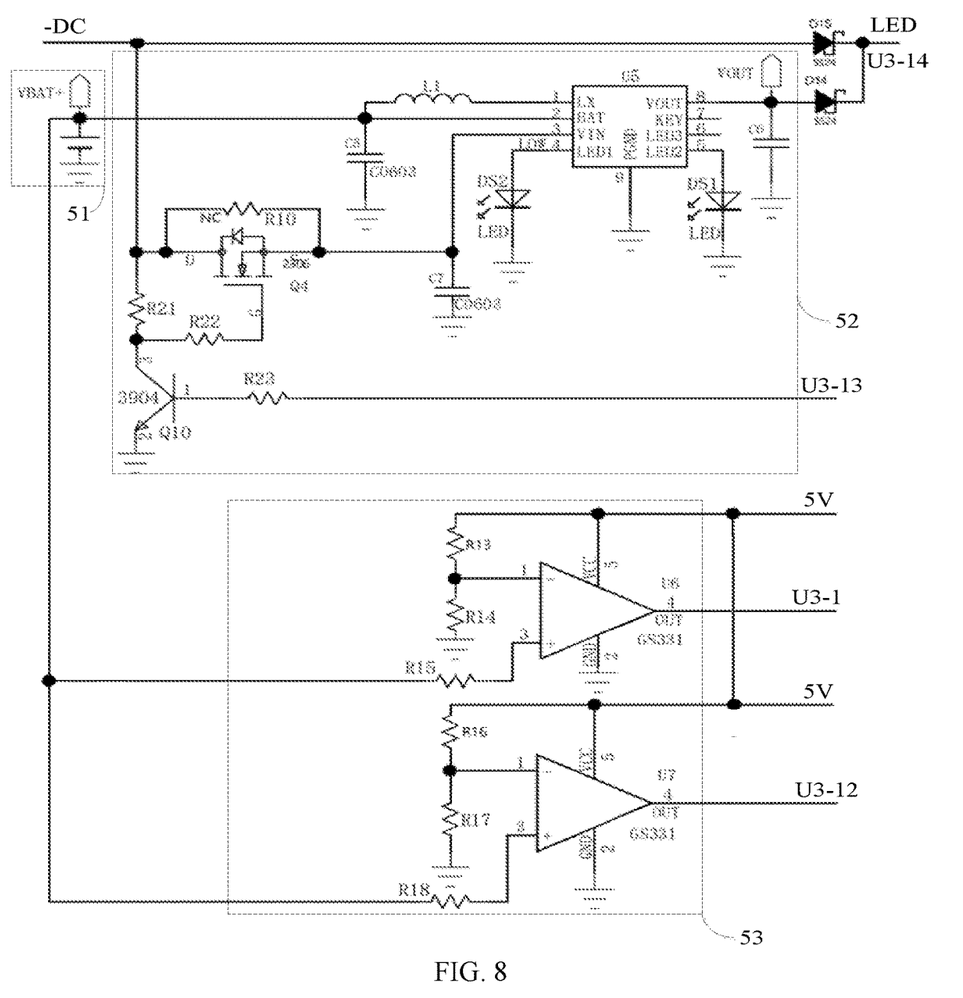
FIG. 8 is a schematic circuit diagram of a power module in FIG. 7.

FIG. 8 is a schematic circuit diagram of a power module 50. The power module 50 includes a battery unit 51, a charging unit 52 and a voltage detection unit 53.

As shown in FIG. 8, the battery unit 51 is a lithium battery VBAT+, which is configured to store electric energy. The charging unit 52 includes a charging switch control circuit and a charging and discharging circuit. The charging and discharging circuit is connected to the charging switch control circuit and the battery unit 51 respectively. Further, the charging switch control circuit is respectively connected to the power converting module 40 and the main control module 20. The voltage detection unit 53 includes a comparison circuit, which is respectively connected to the battery unit 51 and the main control module 20.

As shown in the schematic circuit diagram of FIG. 5 and the schematic circuit diagram of FIG. 8, in the battery unit 51, the negative electrode of the lithium battery VBAT+ is grounded.

In the charging unit 52, the first pin LX of the charging chip U5 in the charging and discharging circuit is grounded through the inductor L1 and the lithium battery VBAT+. The second pin BAT of the charging chip U5 is grounded. The second pin BAT of the charging chip U5 is grounded through the capacitor C5. The third pin VIN of the charging chip U5 is grounded through the capacitor C7, and the third pin of the charging chip U5 is further connected to the charging switch control circuit, specifically connected to the source S of the NMOS transistor Q4. The fourth pin LED1 of the charging chip U5 is grounded through the LED lamp DS2. The fifth pin LED2 of the charging chip U5 is grounded through the LED lamp DS1. The sixth pin and the seventh pin of the charging chip U5 are vacant. The eighth pin VOUT of the charging chip U5 is configured to output voltage, and is further connected to the LED lamp of the illumination module 30 through the diode D14. The eighth pin of the charging chip U5 is grounded through the capacitor C6.

In the charging unit 52, the base of the NPN audion Q10 in the charging switch control circuit is connected to the thirteenth pin PB1 of the single chip microcomputer U3 through the resistor R23. The emitting electrode of the NPN audion Q10 is grounded, and the collector of the NPN audion Q10 is connected to the gate G of the NMOS transistor Q4 through the resistor R22. The collector of the NPN audion Q10 is further respectively connected to the drain D of the NMOS transistor Q4 and the output terminal of the power converting module 40 through the resistor R21. The output terminal of the power converting module 40 is respectively connected to the LED lamp of the illumination module 30 and the fourteenth pin PB2 of the single chip microcomputer U3 in the main control module 20 through the diode D15.

In the voltage detection unit 53, the first pin of the voltage comparator U6 in the comparison circuit is connected to the working voltage through the resistor R13. The fifth pin VCC of the voltage comparator U6 is connected to the working voltage. The first pin of the voltage comparator U6 is further grounded through the resistor R14. The second pin GND of the voltage comparator U6 is grounded, and the third pin of the voltage comparator U6 is connected to the lithium battery VBAT+ through a resistor R15. The fourth pin OUT of the voltage comparator U6 is connected to the first pin PB5 of the microcontroller U3.

The first pin of the voltage comparator U7 in the comparison circuit is connected to the working voltage through the resistor R16. The fifth pin VCC of the voltage comparator U7 is connected to the working voltage, and the first pin of the voltage comparator U7 is further grounded through the resistor R17. The second pin GND of the voltage comparator U7 is grounded, and the third pin of the voltage comparator U7 is connected to the lithium battery VBAT+ through a resistor R18. The fourth pin OUT of the voltage comparator U7 is connected to the twelfth pin PB0 of the single chip microcomputer U3.

When the mobile phone charger is connected to the alternating current, the power module 50 receives the supply voltage of the power converting module 40, and automatically detects the charging. The voltage detection unit 53 detects the voltage of the battery unit 51, and the voltage comparators U6 and U7 will send the detected voltage signal of the lithium battery VBAT+ to the single chip microcomputer U3 of the main control module 20. The single chip microcomputer U3 is configured to compare the detected voltage signal with the preset voltage signal. If the detected voltage is less than the preset voltage, that is, the electric quantity of the lithium battery is lower than the preset electric quantity, the single chip microcomputer U3 will control the charging unit 52 to charge the lithium battery VBAT+. If the detected voltage is higher than or equal to the preset voltage, that is, the lithium battery has sufficient electric quantity, the single chip microcomputer U3 will control the charging unit 52 to stop charging the lithium battery VBAT+.

When the mobile phone charger is not connected to the alternating current, the lithium battery VBAT+ of the power module 50 may supply power to the illumination module 30, the sensing module 10 and the main control module 20 through the charging unit 52 and the diode D14. In this way, the mobile phone charger still has the illumination function although not connected to the alternating current.

This embodiment provides a mobile phone charger with a smart night lamp. A standby battery 140 is provided in the housing 100 of the mobile phone charger. Not only a power converting module 40, a main control module 20, a sensing module 10, an illumination module 30, and a voice module 60 are provided on the control circuit, but also a power module 50 is provided on the control circuit. The added power module 50 enables the mobile phone charger to perform the illumination function normally when the mobile phone charger is not connected to the alternating current. In addition, the power module 50 can automatically charge and stop charging according to the electric quantity, to ensure the sufficient electric quantity of the standby battery 140 while maintaining the service life of the battery, which is more intelligent and convenient.

As shown in FIG. 2, FIG. 3, FIG. 5, FIG. 8 and FIG. 9, based on any one of the first embodiment to the third embodiment, a fourth embodiment of the mobile phone charger with smart night lamp is provided in the present disclosure.

FIG. 2 is a schematic view of an external structure of the mobile phone charger, and FIG. 3 is a structural schematic view of the mobile phone charger. The mobile phone charger may further include a cover board 150 provided on a side of the housing 100 away from the plug 101. The cover board 150 is provided on the side of the drive board 120 away from the circuit board 110, and is parallel to the drive board 120. The cover board 150 is made of a transparent material.

As shown in FIG. 3, in this embodiment, the side of the housing 100 away from the plug 101 is provided with a transparent cover board 150, and the transparent cover board 150 is parallel to the drive board 120 to transmit the illumination light of the illumination assembly 122 on the drive board 120. In this way, the luminous area can be increased, and the volume of the mobile phone charger can be fully used, making the appearance beautiful.

Further, the circuit board 110 is provided vertically to the drive board 120, and a protrusion is provided on the edge of the circuit board 110. The protrusion is configured to pass through the drive board 120 and abut against the cover board 150.

The circuit board 110 is provided vertically to the drive board 120, and an edge of the circuit board 110 is provided with a protrusion. The protrusion passes through the drive board 120 and abuts against the cover board 150.

The circuit board 110 is provided vertically to the drive board 120, which can save the internal space of the mobile phone charger and reduce the volume of the mobile phone charger. The protrusion is configured to pass through the drive board 120 and abut against the cover board 150. In this case, the circuit board 110 is connected to the drive board 120, and the drive board 120 can be provided between the cover board 150 and the circuit board 110. In this fixing way, the internal components of the mobile phone charger can be stable, and the power control circuit on the circuit board 110 can be prevented from loosening, and a malfunction of the mobile phone charger can be avoided.

Figure 9:
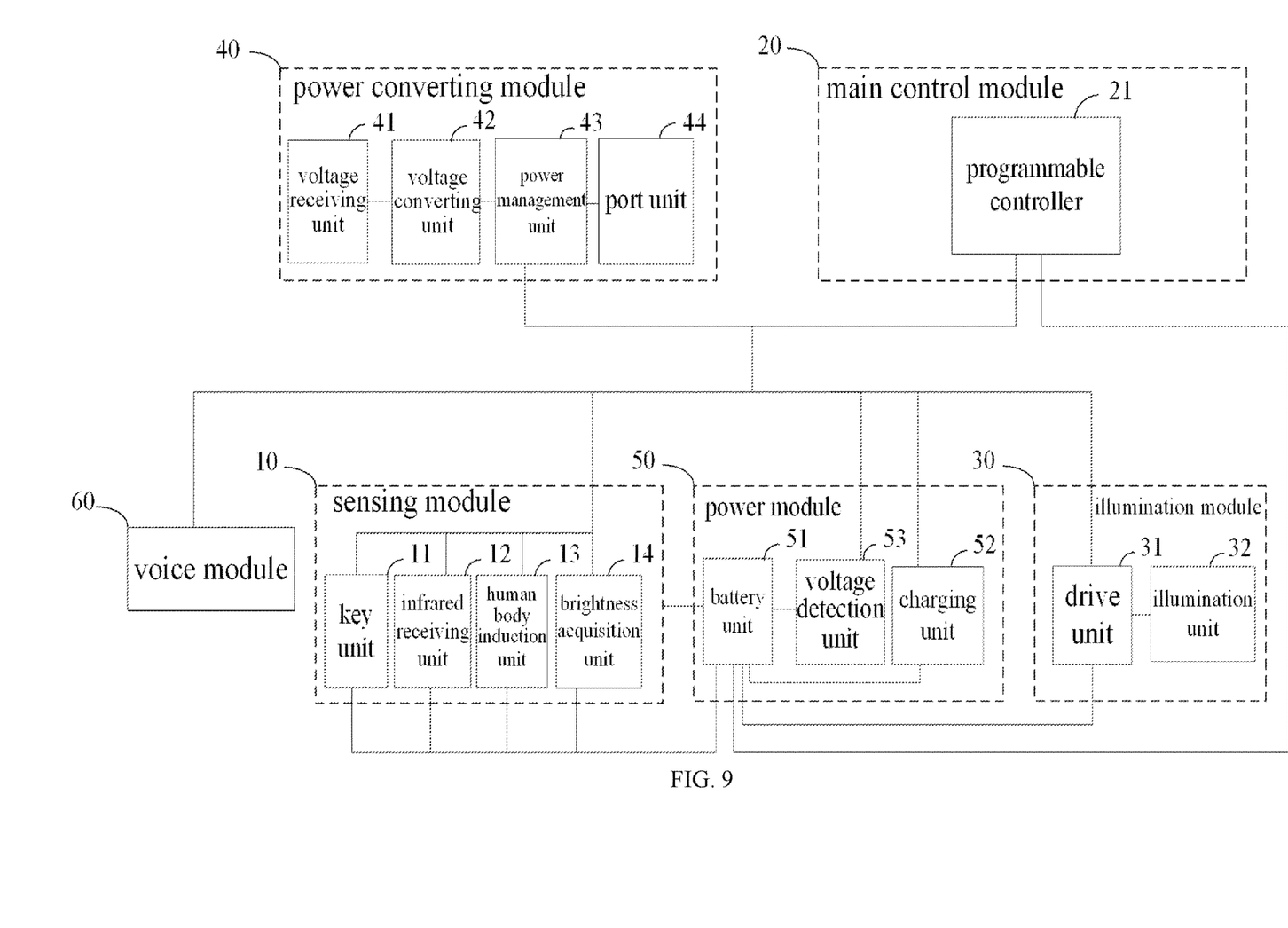
FIG. 9 is a schematic diagram of functional modules in the power control circuit of the mobile phone charger with the smart night lamp according to a fourth embodiment of the present disclosure.

FIG. 9 is a schematic diagram of functional modules in the power control circuit of the mobile phone charger. The illumination module 30 may include a drive unit 31 and an illumination unit 32.

The drive unit 31 is connected to the main control module 20, and is configured to generate a drive signal according to the illumination control signal.

The illumination unit 32 is connected to the drive unit 31, and is configured to make the illumination assembly 122 perform illumination according to the drive signal, and transmit light through the cover board 150.

The illumination module 30 is respectively connected to the main control module 20, the power converting module 40 and the power module 50, and is configured to perform illumination according to the illumination control signal. The illumination module 30 is further configured to adjust brightness according to the brightness adjustment signal. The drive unit 31 of the illumination module 30 is connected to the main control module 20, and is configured to generate a drive signal according to the illumination control signal. The illumination unit 32 of the illumination module 30 is connected to the drive unit 31, and is configured to perform illumination according to the drive signal.

As shown in the schematic circuit diagram of FIG. 5 and the schematic diagram of the circuit of FIG. 8, the illumination module 30 includes a drive unit 31 and an illumination unit 32. The drive unit 31 includes a current control circuit 1 and a current control circuit 2, and the illumination unit 32 includes the LED circuit 1 and the LED circuit 2.

The LED circuit 1 of the illumination unit 32 includes the LED lamp string 1 composed of a plurality of LED lamps. The LED lamp string 1 is composed of the LED lamp D7, D3, D2, D11, D12 and D13. The anode of the LED lamp string 1 is connected to the output terminal of the power converting module 40 and the output terminal of the power module 50 in FIG. 8. The cathode of the LED light string 1 is connected to the current control circuit 1. The cathode of the LED lamp D12 is connected to the drain D of the NMOS transistor Q7 through the resistor R7, and the cathode of the LED lamp D13 is connected to the drain D of the NMOS transistor Q8 through the resistor R8.

The gate G of the NMOS transistor Q7 in the current control circuit 1 is connected to the sixth pin PA6 of the single chip microcomputer U3 of the main control module 20 through the resistor R4, and the gate G of the NMOS transistor Q7 is further connected to the gate G of the NMOS transistor Q8. Each source S of the NMOS transistor Q7 and Q8 is grounded.

The LED circuit 2 of the illumination unit 32 includes the LED lamp string 2 composed of a plurality of LED lamps. The LED lamp string 2 is composed of 2 the LED lamp D6, D5, D4, D8, D9 and D10. The anode of the LED lamp string 2 is connected to the output terminal of the power converting module 40 and the output terminal of the power module 50 in FIG. 8. The cathode of the LED light string 2 is connected to the current control circuit 2. The cathode of the LED lamp D9 is connected to the drain D of the NMOS transistor Q1 through the resistor R3, and the cathode of the LED lamp D10 is connected to the drain D of the NMOS transistor Q1 through the resistor R6.

The gate G of the NMOS transistor Q1 in the current control circuit 2 is connected to the ninth pin PA4 of the single chip microcomputer U3 of the main control module 20 through the resistor R5. The gate G of the NMOS transistor Q1 is further connected to the gate G of the NMOS transistor Q5. Each source S of the NMOS transistor Q1 and Q5 is grounded.

When the mobile phone charger is connected to the alternating current, the power control module 40 supplies power to the illumination module 30 through the LED circuit 1 of the illumination unit 32. When the mobile phone charger is not connected to the alternating current, the power module 50 supplies power to the illumination module 30 through the LED circuit 2 of the illumination unit 32. After the illumination module 30 is powered on, the main control module 20 sends an illumination control signal to the current control circuit of the drive unit 31 to drive the LED lamp to perform illumination, thereby realizing the illumination function.

Further, as shown in FIG. 2 and FIG. 3, the mobile phone charger may further include a protective cover 151 passing through and provided on the cover board 150 at a position corresponding to the sensing device 121, and the protective cover 151 is configured to wrap the sensing device 121.

As shown in FIG. 3, the protective cover 151 can be a Fresnel lens, which focuses and refracts the pyrolytic infrared signal to the sensing device 121, and the sensing device 121 transmits the infrared signal to the main control module 20. The main control module 20 is configured to generate an illumination control signal according to the infrared signal, to control the illumination module 30 to perform illumination, thereby realizing an illumination function by human body induction.

The sensing device 121 includes an infrared receiving sensor and a human body induction sensor.

The sensing module 10 may further include an infrared receiving unit 12 and a human body induction unit 13.

The infrared receiving unit 12 is configured to receive an infrared signal through the infrared receiving sensor.

The infrared receiving sensor may be an infrared remote control receiving head for receiving an infrared remote control signal paired with a mobile phone charger.

The human body induction unit 13 is configured to detect whether there is a human body approaching through the human body induction sensor, and output a human body induction signal.

The human body induction unit 13 is configured to sense an infrared signal reflected by the human body.

The HCI signal is the infrared signal or the human body induction signal.

In an embodiment, the user sets the sensing response mode to an illumination display mode. That is, after the human body induction unit 13 of the sensing module 10 in the mobile phone charger receives the infrared signal reflected by the user, the infrared signal is sent to the main control module 20. The main control module 20 is configured to generate an illumination control signal, and send the illumination control signal to the illumination module 30, to control the illumination module 30 to perform illumination.

In addition, in an embodiment, not only the mobile phone charger has functions such as the human body induction illumination display, the human body induction voice prompt, the touch key illumination, and the like, but also the mobile phone charger has an "ambient light" function, and the brightness of the light can be adjusted. In the "sensing light" mode, the lamp is turned on when the user come, and the lamp is turned off when the user leave. The brightness of the light is adaptively adjusted according to the ambient brightness. Similarly, the lamp will enter the low power mode after the lamp is turned off for a preset time. In the "ambient light" mode, the color of the light, the flashing form of the light tube, and the light brightness can be adjusted.

As shown in FIG. 8, the sensing module 10 includes an infrared receiving unit 12 and a human body induction unit 13. The infrared receiving unit 12 includes an infrared remote control receiving circuit, and the human body induction unit 13 includes a human body sensing circuit.

In the infrared receiving unit 12, the first pin of the infrared remote control receiving head U2 in the infrared remote control receiving circuit is connected to the eighth pin PA3 of the single chip microcomputer U3 of the main control module 20. The second pin of the infrared remote control receiving head U2 is grounded, and the third pin of the infrared remote control receiving head U2 is connected to the power converting module 40 and the power module 50, to receive the working voltage.

When the mobile phone charger is connected to the alternating current, the power control module 40 supplies power to the infrared remote control receiving head U2. When the mobile phone charger is not connected to the alternating current, the power module 50 supplies power to the infrared remote control receiving head U2. After the infrared remote control receiving head U2 is powered on, the received infrared remote control signal is sent to the main control module 20. The main control module 20 may generate a illumination control signal according to the infrared remote control signal, to control the LED lamp to perform illumination, thereby making the lamp on by a remote control.

In the human body induction unit 13, the first pin VSS of the regulated voltage chip Q3 of the power supply in the human body sensing circuit is connected to the third pin GND of the human body induction sensor Q2. The second pin VOUT of the regulated voltage chip Q3 of the power supply is connected to the first pin VDD of the human body induction sensor Q2. The third pin VIN of the regulated voltage chip Q3 of the power supply is connected to the power converting module 40 and the power module 50 to receive the working voltage. The third pin VIN of the regulated voltage chip Q3 of the power supply is grounded through the capacitor C1. The second pin VOUT of the human body induction sensor Q2 is connected to the tenth pin PA0 of the single chip microcomputer U3. The second pin VOUT of the human body induction sensor Q2 is further grounded through the resistor R2.

When the mobile phone charger is connected to the alternating current, the power control module 40 supplies power to the human body sensing circuit through the regulated voltage chip Q3 of the power supply. When the mobile phone charger is not connected to the alternating current, the power module 50 supplies power to the human body sensing circuit through the regulated voltage chip Q3 of the power supply. After the human body sensing circuit is powered on, the infrared signal reflected by the human body and sensed by the human body induction sensor Q2 is sent to the single chip microcomputer U3 of the main control module 20 through the second pin OUT of the human body induction sensor Q2. The main control module 20 may generate an illumination control signal according to the infrared signal reflected by the human body, to control the LED lamp to perform illumination, thereby realizing the induction illumination function.

Furthermore, the mobile phone charger may further include a remote controller for sending an infrared signal to the sensing device 121.

The remote controller is configured to send an infrared signal according to the user's operation, and the infrared signal is correspondingly received by the infrared receiving sensor of the sensing device 121.

Further, the housing 100 may further include a touch key 103 provided on a surface of the housing 100.

The touch key 103 can be provided on any side surface of the housing 100 of the mobile phone charger 100.

The sensing module 10 may further include a key unit 11 configured to collect a key signal triggered by the touch key 103.

The HCI signal is the key signal.

As shown in FIG. 3, the marking of the touch key 103 can be any pattern, which can be set according to actual needs, such as a switch pattern marking in FIG. 3. In an embodiment, the trigger device of the touch key 103 is generally a spring element or a copper foil sheet. The spring element can be welded on a marked position of the drive board 120 close to the touch key 103, and the copper foil sheet is attached inside the housing 100 corresponding to the marked position of the touch key 103.

In an embodiment, when the lamp is not turned on, the lamp on the mobile phone charger will be turned on after a short touch on the touch key 103 for the first time, and the lamp will flash twice and enter the "sensing light" mode after a short touch on the touch key 103 for the second time. The lamp will flash once and all functions will be turned off after a short touch on the touch key 103 for the third time, and the lamp will turn off all functions and enter the low power mode after a preset time. When the lamp is turned on, the brightness will be increased after a long touch on the touch key 103 for the first time, and the brightness will be decreased after a long touch on the touch key 103 for the second time, or the brightness will be adjusted to the preset brightness after a long touch on the touch key 103 for the first time.

As shown in FIG. 5, the sensing module 10 may further include a key unit 11, and the key unit 11 includes a touch key control circuit.

In the key unit 11, the first pin OUT of the control chip U4 in the touch key control circuit is connected to the fifth pin PA7 of the single chip microcomputer U3 of the main control module 20. The second pin GND of the control chip U4 is grounded, and the third pin SO of the control chip U4 is grounded sequentially through the resistor R11 and the capacitor C4. The third pin SO of the control chip U4 is further connected to the touch key SW1 through the resistor R11. The fourth pin SLH of the control chip U4 is connected to the fifth pin VDD of the control chip U4, and the fifth pin VDD is grounded through the capacitor C3. The fifth pin VDD is further connected to the power converting module 40 and the power module 50 to receive the working voltage.

When the touch key 103 on the housing 100 is touched by the user, the key signal is triggered by the touch key SW1. The control chip U4 is configured to send the key signal to the single chip microcomputer U3 of the main control module 20 through the first pin OUT. The main control module 20 controls the illumination module 30 to perform illumination, to realize an illumination function of the touch key 103.

Further, the sensing device 121 may further include a brightness acquisition sensor.

As shown in the structural view of FIG. 3, the brightness acquisition sensor is provided on the drive board 120, and located on the same side as the illumination assembly 122 and the sensing device 121. The brightness acquisition sensor is configured to collect the brightness of the light passing through the transparent cover 150.

The sensing module 10 may further include a brightness acquisition unit 14. The brightness acquisition unit 14 is configured to collect ambient brightness through the brightness acquisition sensor, and output a brightness acquisition signal.

The main control module 20 is connected to the brightness acquisition unit 14, and is further configured to generate a brightness adjustment signal according to the brightness acquisition signal.

The illumination module 30 is further configured to adjust the illumination brightness of the illumination assembly 122 according to the brightness adjustment signal.

In an embodiment, when the lamp is turned on, if the brightness acquisition unit 14 collects a decrease in the ambient brightness, the collected ambient brightness signal will be sent to the main control module 20 by the brightness acquisition unit 14. Then the main control module 20 will detect the decrease in the ambient brightness, and a brightness increase signal will be sent to the drive unit 31 by the main control module 20. In this case, the drive unit 31 will increase the light brightness of the illumination module 30 to a preset brightness.

As shown in FIG. 5, the sensing module 10 further includes a brightness acquisition unit 14, and the brightness acquisition unit 14 includes a brightness sensing circuit.

In the brightness acquisition unit 14, the second pin of the brightness sensor D1 in the brightness sensing circuit is connected to the power converting module 40 and the power module 50, to receive the working voltage. The first pin of the brightness sensor D1 is connected to the seventh pin PRSTB of the single chip microcomputer U3, and the first pin of the brightness sensor D1 is further grounded through the resistor R9.

When the mobile phone charger is connected to the alternating current, the power control module 40 is configured to supply power to the brightness sensing circuit through the brightness sensor D1. When the mobile phone charger is not connected to the alternating current, the power module 50 is configured to supply power to the brightness sensing circuit through the brightness sensor D1. After the brightness sensor D1 is powered on, the collected ambient brightness signal is sent to the single chip microcomputer U3 of the main control module 20. The main control module 20 generates a brightness control signal according to the ambient brightness signal, to control the illumination brightness of the LED lamp, thereby a self-adaptive adjustment function for the illumination brightness of the mobile phone charger.

Further, the power converting module 40 may include a voltage receiving unit 41, a voltage converting unit 42, a power management unit 43 and a port unit 44.

The voltage receiving unit 41 is configured to receive the alternating current through the plug 101.

The voltage converting unit 42 is connected to the voltage receiving unit 41, and is configured to perform a voltage conversion on the alternating current and output the direct current.

The power management unit 43 is connected to each of the voltage converting unit 42, the sensing module 10, the main control module 20 and the illumination module 30. The power management unit 43 is configured to output the supply voltage to the sensing module 10, the main control module 20 and the illumination module 30 according to the direct current.

The port unit 44 is connected to the power management unit 43, and is configured to output the supply voltage to a charging device through the port.

As shown in FIG. 5, the power converting module 40 includes a voltage receiving unit 41, a voltage converting unit 42 and a power management unit 43.

The voltage receiving unit 41 mainly includes two voltage receiving terminals AC1 and AC2 of the plug 101 for receiving an alternating current of 90-240V.

The voltage converting unit 42 mainly includes a voltage converter U10 for converting an alternating current to a direct current. The power management unit 43 mainly includes a current limiting chip U8.

The first pin AC of the voltage converter U10 is connected to the first pin of the capacitor CX1, and the second pin AC of the voltage converter U10 is connected to the second pin of the capacitor CX1. The first pin of the capacitor CX1 is further connected to the first terminal of the varistor MOV1, and the second pin of the capacitor CX1 is further connected to the second terminal of the varistor MOV1. The first terminal of the varistor MOV1 is further connected to the voltage receiving terminal AC2, and the second terminal of the varistor MOV1 is further connected to the voltage receiving terminal AC1 through the fuse wire F2. The fourth pin +DC of the voltage converter U10 is connected to the second pin of capacitor C106, and the fourth pin +DC is further grounded. The third pin −DC of the voltage converter U10 is connected to the first pin of capacitor C106, and the third pin −DC is further connected to the fourteenth pin PB2 of the single chip microcomputer U3. The third pin −DC is used as the output terminal of the power converting module 40, to output the working voltage to the sensing module 10, the main control module 20, the illumination module 30 and the voice module 60 respectively. The third pin −DC is further connected to the resistor R21 of the power module 50 and the fifth pin of the current limiting chip U8 respectively.

The first pin VOUT of the current limiting chip U8 is connected to the port 111, that is, the first pin VCC of the port J7. The second pin GND of the current limiting chip U8 is grounded, and the third pin SET of the current limiting chip U8 is grounded through the resistor R20. The fourth pin EN of the current limiting chip U8 is connected to the fifth pin VIN through the resistor R19. The fourth pin GND of the port J7 is grounded.

In the power converting module 40, the alternating current received by the voltage receiving terminals AC1 and AC2 of the plug 101, is transmitted to the voltage converter U10 through the varistor MOV1 and the capacitor CX1. The voltage converter U10 is configured to convert the alternating current to the direct current, transmit the direct current to the sensing module 10, the main control module 20, the illumination module 30 and the voice module 60 through the capacitor C106, and supply power to the aforementioned modules. In addition, the voltage converter U10 is further configured to transmit the direct current to the power module 50, to charge the battery unit 51 of the power module 50. The power converting module 40 is further configured to transmit the direct current to the port J7 through the resistor R19 and the current limiting chip U8, to supply power to the mobile phone connected to the port J7.

This embodiment provides a mobile phone charger with a smart night lamp. Based on the above-mentioned embodiments, each functional module in the circuit of the mobile phone charger is enriched. For example, the transparent cover board 150 not only increases the illumination area, but also make the appearance of the mobile phone charger more beautiful. In addition, the human body induction and the brightness acquisition are realized through the transparent protective cover 151 and the transparent cover board 150, thereby improving the volume utilization rate of the mobile phone charger. The added multiple functions may provide users with more choices, which solves the problem that the existing mobile phone charger only has a single function. In this way, not only the function diversity and the use convenience of the mobile phone charger can be improved, but also the mobile phone charger can charge and perform illumination, thereby saving materials and increasing the use value of products.

The above are only some embodiments of the present disclosure, and do not limit the scope of the present disclosure thereto. Any equivalent structure transformation made according to the description and drawings of the present disclosure, or direct/indirect application in other related technical fields are included in the scope of the present disclosure.

The above are only some embodiments of the present disclosure, and do not limit the scope of the present disclosure thereto. Any equivalent structure transformation or equivalent process transformation made according to the description and drawings of the present disclosure, or direct/indirect application in other related technical fields are included in the scope of the present disclosure.

What is claimed is:

1. A mobile phone charger with a smart night lamp, comprising:
   a housing, wherein a side wall of the housing is provided with a plug;
   a circuit board provided in the housing, wherein the circuit board is provided with a port; and
   a drive board provided in the housing and connected to the circuit board, wherein a side of the drive board away from the circuit board is provided with a sensing device and an illumination assembly, the port extends through the drive board to the housing, the circuit board is further provided with a power control circuit, and the power control circuit comprises:
      a sensing module, configured to collect a human computer interaction (HCI) signal through the sensing device;
      a main control module, connected to the sensing module and configured to generate an illumination control signal according to the HCI signal;
      an illumination module, connected to the main control module and configured to make the illumination assembly perform illumination according to the illumination control signal; and
      a power converting module, connected to each of the sensing module, the main control module and the illumination module, wherein the power converting module is configured to convert an alternating current received through the plug to a direct current, output a supply voltage to the port, and supply power to the sensing module, the main control module and the illumination module according to the supply voltage.

2. The mobile phone charger of claim 1, further comprising:
   a horn provided in the housing, wherein:
      another side wall of the housing is provided with a sound outlet corresponding to the horn,
      the power control circuit further comprises a voice module connected to the main control module and the power converting module respectively,
      the main control module is further configured to generate a voice control signal according to the HCI signal,
      the voice module is configured to make the horn perform voice prompts according to the voice control signal, and
      the power converting module is further configured to supply power to the voice module according to the supply voltage.

3. The mobile phone charger of claim 1, further comprising:
   a standby battery provided in the housing,
   wherein the power control circuit further comprises a power module connected to each of the power converting module, the sensing module, the main control module and the illumination module, and the power module is configured to charge the standby battery according to the supply voltage, and supply power to the sensing module, the main control module and the illumination module through the standby battery.

4. The mobile phone charger of claim 3, wherein the power module comprises:
   a battery unit configured to store electrical energy through the standby battery;
   a charging unit connected to the power converting module and the battery unit respectively, the charging unit being configured to charge the standby battery according to the supply voltage; and
   a voltage detection unit connected to the battery unit and the main control module respectively, the voltage detection unit being configured to detect an electric quantity stored in the standby battery and output a detection signal to the main control module,
   wherein:
   the main control module is further configured to generate a charging control signal according to the detection signal; and the charging unit is further connected to the main control module, and configured to charge or stop charging according to the charging control signal.

5. The mobile phone charger of claim 1, further comprising a cover board provided on a side of the housing away from the plug,
wherein:
the cover board is provided on the side of the drive board away from the circuit board and is parallel to the drive board, and the cover board is made of a transparent material; and
the illumination module comprises:
  a drive unit connected to the main control module, the drive unit being configured to generate a drive signal according to the illumination control signal; and
  an illumination unit connected to the drive unit, the illumination unit being configured to make the illumination assembly perform illumination according to the drive signal, and transmit light through the cover board.

6. The mobile phone charger of claim 5, further comprising a protective cover passing through and provided on the cover board at a position corresponding to the sensing device, the protective cover being configured to wrap the sensing device,
wherein:
the sensing device comprises an infrared receiving sensor and a human body induction sensor,
the sensing module comprises:
  an infrared receiving unit, configured to receive an infrared signal through the infrared receiving sensor; and
  a human body induction unit, configured to detect whether there is a human body approaching the mobile phone charger through the human body induction sensor and output a human body induction signal,
  wherein the HCI signal is the infrared signal or the human body induction signal.

7. The mobile phone charger of claim 6, wherein:
the housing further comprises a touch key provided on a surface of the housing,
the sensing module further comprises a key unit configured to collect a key signal triggered by the touch key, and
the HCI signal is the key signal.

8. The mobile phone charger of claim 7, wherein:
the sensing device further comprises a brightness acquisition sensor,
the sensing module further comprises a brightness acquisition unit, the brightness acquisition unit is configured to collect ambient brightness through the brightness acquisition sensor, and output a brightness acquisition signal,
the main control module is connected to the brightness acquisition unit, and is further configured to generate a brightness adjustment signal according to the brightness acquisition signal, and
the illumination module is further configured to adjust illumination brightness of the illumination assembly according to the brightness adjustment signal.

9. The mobile phone charger of claim 1, wherein the main control module comprises a programmable controller connected to the sensing module, and the programmable controller is configured to generate an illumination control signal according to a preset program and the HCI signal.

10. The mobile phone charger of claim 1, wherein the power converting module comprises:
  a voltage receiving unit configured to receive the alternating current through the plug;
  a voltage converting unit connected to the voltage receiving unit, the voltage converting unit being configured to perform voltage conversion on the alternating current and output the direct current;
  a power management unit connected to each of the voltage converting unit, the sensing module, the main control module and the illumination module, wherein the power management unit is configured to output the supply voltage according to the direct current, and output the supply voltage to the sensing module, the main control module and the illumination module; and
  a port unit, connected to the power management unit and configured to output the supply voltage to a charging device through the port.

* * * * *

UNITED STATES PATENT AND TRADEMARK OFFICE
CERTIFICATE OF CORRECTION

| | | |
|---|---|---|
| PATENT NO. | : 12,237,699 B2 | Page 1 of 1 |
| APPLICATION NO. | : 18/169335 | |
| DATED | : February 25, 2025 | |
| INVENTOR(S) | : Xizhi Chen | |

It is certified that error appears in the above-identified patent and that said Letters Patent is hereby corrected as shown below:

On the Title Page

Item [73], Assignee, change "Shenzhen Hualiwei Technology Co., Ltd." to --Shenzhen Hualiwei Technology Co., Ltd--

Signed and Sealed this
Eighth Day of April, 2025

Coke Morgan Stewart
*Acting Director of the United States Patent and Trademark Office*